(12) United States Patent
Patil et al.

(10) Patent No.: US 12,534,067 B2
(45) Date of Patent: Jan. 27, 2026

(54) SYSTEM AND METHOD FOR VEHICLE NAVIGATION

(71) Applicant: TATA ELXSI LIMITED, Bangalore (IN)

(72) Inventors: Mansi Shrirang Patil, Bangalore (IN); Jyotsana Singh, Bangalore (IN)

(73) Assignee: TATA ELXSI LIMITED, Bangalore (IN)

( * ) Notice: Subject to any disclaimer, the term of this patent is extended or adjusted under 35 U.S.C. 154(b) by 274 days.

(21) Appl. No.: 18/259,557

(22) PCT Filed: Dec. 16, 2021

(86) PCT No.: PCT/IB2021/061810
§ 371 (c)(1),
(2) Date: Jun. 27, 2023

(87) PCT Pub. No.: WO2022/144667
PCT Pub. Date: Jul. 7, 2022

(65) Prior Publication Data
US 2024/0059277 A1   Feb. 22, 2024

(30) Foreign Application Priority Data
Dec. 29, 2020   (IN) .............................. 202041056855

(51) Int. Cl.
*B60W 30/06*   (2006.01)
*B60W 10/04*   (2006.01)
(Continued)

(52) U.S. Cl.
CPC ............ *B60W 30/06* (2013.01); *B60W 10/04* (2013.01); *B60W 10/18* (2013.01); *B60W 10/20* (2013.01);
(Continued)

(58) Field of Classification Search
CPC ...... B60W 30/06; B60W 10/04; B60W 10/18; B60W 10/20; B60W 2552/53;
(Continued)

(56) References Cited

U.S. PATENT DOCUMENTS

| 11,643,069 B2 * | 5/2023 | Hamai ................. B60W 10/20 701/41 |
| 2008/0154464 A1 | 6/2008 | Sasajima et al. |

(Continued)

OTHER PUBLICATIONS

International Search Report for PCT/IB2021/061810, dated Dec. 16, 2021, 2 pages.
(Continued)

*Primary Examiner* — Dale W Hilgendorf
*Assistant Examiner* — Hana Lee
(74) *Attorney, Agent, or Firm* — Finnegan, Henderson, Farabow, Garrett & Dunner, LLP

(57) ABSTRACT

A method for automatic navigation and parking of a vehicle (202) in a tight parking space using a navigation system (200) is provided. The method includes identifying a vacant slot (406C) in a designated area (204) and stopping the vehicle (202) at a current position (412) within the designated area (204) upon identifying the vacant slot (406C). The method further includes determining a linear distance by which the vehicle (202) has to initially move from the current position (412) to a start point (426) for ultimately reaching a destination point (418) within the vacant slot (406C) via a middle point (438) and a tangential point (422). The navigation system (200) determines the linear distance based on a horizontal distance between the tangential point (422) and a collinear point (436) and one or more coordinates of the tangential point (422), the start point (426), and the current position (412).

8 Claims, 7 Drawing Sheets

(51) Int. Cl.
*B60W 10/18* (2012.01)
*B60W 10/20* (2006.01)
*G06V 20/58* (2022.01)

(52) U.S. Cl.
CPC ..... *G06V 20/586* (2022.01); *B60W 2420/403* (2013.01); *B60W 2552/53* (2020.02); *B60W 2710/18* (2013.01); *B60W 2710/20* (2013.01); *B60W 2720/106* (2013.01); *B60W 2720/24* (2013.01)

(58) Field of Classification Search
CPC ....... B60W 2420/403; B60W 2710/18; B60W 2710/20; B60W 2720/106; B60W 2720/24; G06V 20/586
See application file for complete search history.

(56) References Cited

U.S. PATENT DOCUMENTS

| | | | |
|---|---|---|---|
| 2010/0033348 A1* | 2/2010 | Kawabata | B62D 15/028 340/932.2 |
| 2010/0049402 A1* | 2/2010 | Tanaka | B60R 1/26 701/41 |
| 2013/0151059 A1 | 6/2013 | Widmann | |
| 2015/0025732 A1* | 1/2015 | Min | B62D 15/0285 701/23 |
| 2015/0331423 A1 | 11/2015 | Volger et al. | |
| 2020/0081446 A1* | 3/2020 | Ishinoda | B62D 15/0285 |
| 2020/0198622 A1* | 6/2020 | Tagawa | B60W 30/06 |
| 2020/0258385 A1* | 8/2020 | Mahajan | G01S 17/931 |
| 2022/0073101 A1* | 3/2022 | Wang | B62D 15/0285 |

OTHER PUBLICATIONS

Written Opinion of the International Searching Authority, PCT/IB2021/061810, dated Dec. 16, 2021, 5 pages.
Lee et al.; "Limited Visibility Aware Motion Planning for Autonomous Valet Parking Using Reachable Set Estimation", Sensors, MDPI, vol. 21, issue 4, pp. 1-17, 2021.
Prabhakar et al.; "Obstacle Detection and Classification using Deep Learning for Tracking in High-Speed Autonomous Driving", 2017 IEEE Region 10 Symposium (TENSYMP), 5 pages.

* cited by examiner

SYSTEM AND METHOD FOR VEHICLE NAVIGATION

RELATED ART

Embodiments of the present disclosure relate generally to vehicle navigation. More particularly, the present disclosure relates to a system and associated method for automatic parking of a vehicle in a tight parking space.

Advancement in automotive technology has led to development of semi-autonomous and autonomous vehicles. Semi-autonomous vehicles still require a driver, but can perform certain functions, such as steering control, acceleration control, and brake control, autonomously. Autonomous vehicles, however, are driven and parked automatically. In particular, certain level-two autonomous vehicles plan their paths to vacant slots by using either a single-arc or a multi-arc approach. Alternatively, certain autonomous vehicles may use Reeds-Shepp approach, such as described in the non-patent literature titled "Optimal paths for a car that goes both forwards and backwards" authored by J. A. Reeds and L. A. Shepp. The Reeds-Shepp approach generally provides the shortest path for a vehicle to navigate from a current position to a vacant slot.

However, in practice, autonomous vehicles utilizing this approach still need to make multiple turns and require a large distance in order to safely navigate and park themselves in identified vacant slots. This is because, in real-world scenarios, the turning point output by the Reeds-Shepp approach is often laterally offset with respect to the current position of the vehicle. Hence, the vehicle has to perform multiple back and forth movements to reach the turning point. Performing multiple back and forth movements increases an overall time taken to park the vehicle, increase fuel consumption, and proves difficult for inexperienced drivers.

As an alternative to performing multiple back and forth movements, certain vehicles may perform a long back and forth movement to reach the turning point. For example, a vehicle may initially move forward ahead of the turning point, adjust an associated heading, and finally move backward to the turning point. However, the long back and forth movement to the turning point requires a lot of space and is not suitable for a tight parking space, for example, having a parking aisle width of 4.9 meters or a lesser value.

Hence, there is a need for an improved system that enables a vehicle to park itself in a vacant slot without needing to perform multiple back and forth movements, especially in tight parking spaces.

BRIEF DESCRIPTION

It is an objective of the present disclosure to provide a method for navigation of a vehicle. The method includes identifying a vacant slot in a designated area using one or more images acquired by one or more image acquisition units deployed on the vehicle when navigating within the designated area. Further, the method includes stopping the vehicle at a current position within the designated area upon identifying the vacant slot. The current position represents an origin of a designated coordinate frame including an X-axis and a Y-axis. Additionally, the method includes determining a vertical distance between a destination point located within the vacant slot and a top boundary marking of the vacant slot, a tangential point located within the vacant slot, a start point located along the X-axis at a linear distance from the current position using the one or more images. The method further includes determining a collinear point located along the X-axis at a horizontal distance from the tangential point using the one or more images.

Furthermore, the method includes determining the linear distance between the current position and the start point along the X-axis based on the horizontal distance between the tangential point and the collinear point and one or more coordinates of the tangential point, the start point, and the current position. Moreover, the method includes identifying a middle point that is at an intersection of a first imaginary circle and a second imaginary circle. A center of the first imaginary circle is located along the Y-axis at a first distance from the start point. A center of the second imaginary circle is located along the X-axis at a second distance from the tangential point. Each of the first distance and the second distance is equivalent to a minimum turning radius of the vehicle.

The method further includes moving the vehicle from the current position by the determined linear distance along the X-axis to the start point by manually or automatically controlling one or more of a throttle and a brake of the vehicle using a control system. Further, the method includes moving the vehicle in a forward direction by accelerating and continuously adjusting a steering angle of the vehicle along a first curve path for reaching the middle point. Furthermore, the method includes moving the vehicle in a reverse direction by accelerating and continuously adjusting the steering angle of the vehicle along a second curve path for reaching the tangential point. A radius of curvature of each of the first curve path and the second curve path corresponds to the minimum turning radius of the vehicle. Additionally, the method includes moving the vehicle linearly by the determined vertical distance along the Y-axis into the vacant slot by controlling one or more of the throttle and the brake of the vehicle using the control system.

Moreover, the method includes processing one or more of the acquired images by a perception system to identify, boundary markings of the vacant slot from the acquired images. The method further includes identifying dimensions of the vacant slot based on the boundary markings identified from the acquired images. The method further includes identifying the destination point located within the vacant slot based on the identified dimensions of the vacant slot. The method further includes identifying an X-coordinate and a Y-coordinate of the tanuential point based on a longitudinal margin and the vertical distance between the destination point and the top boundary marking of the vacant slot. The longitudinal margin is determined based on the minimum turning radius, a track width of the vehicle, a minimum safety margin, and a width of the vacant slot. The designated area corresponds to a tight parking space. The vehicle moves linearly from the current position within the tight parking space along the X-axis to the start point without performing multiple back and forth movements or a space consuming long back and forth movement.

Further, the method includes determining the horizontal distance between the tangential point and the collinear point based on the minimum turning radius and a vertical offset between the collinear point and the start point. The method further includes determining the vertical offset between the collinear point and the start point based on a difference between a Y-coordinate of the current position and the Y-coordinate of the tangential point. The method further includes computing an angle formed between a first line and a second line based on the determined horizontal distance and the minimum turning radius. The first line connects the center of the second imaginary circle to the center of the first imaginary circle. The second line connects the center of the second imaginary circle to the tangential point. The middle point is identified based on the computed angle, the minimum turning radius, and X-Y coordinates of the center of the second imaginary circle. The designated coordinate frame is an Odom coordinate frame.

It is another objective of the present disclosure to provide a navigation system associated with a vehicle. The navigation system includes a perception system, a path planning system, and a control system. The perception system includes one or more image acquisition units deployed on the vehicle. The perception system identifies a vacant slot in a designated area using one or more images acquired by the image acquisition units when the vehicle navigates within the designated area. The vehicle stops at a current position within the designated area upon identifying the vacant slot. The current position represents an origin of a designated coordinate frame including an X-axis and a Y-axis.

The path planning system is communicatively coupled to the perception system and the image acquisition units. The path planning system determines a vertical distance between a destination point located within the vacant slot and a top boundary marking of the vacant slot, a tangential point located within the vacant slot, a start point located along the X-axis at a linear distance from the current position using the one or more images. The path planning system further determines a collinear point located along the X-axis at a horizontal distance from the tangential point using the one or more images. Furthermore, the path planning system determines the linear distance between the current position and the start point along the X-axis based on the horizontal distance between the tangential point and the collinear point and one or more coordinates of the tangential point, the start point, and the current position.

Additionally, the path planning system identifies a middle point that is at an intersection of a first imaginary circle and a second imaginary circle. A center of the first imaginary circle is located along the Y-axis at a first distance from the start point. A center of the second imaginary circle is located along the X-axis at a second distance from the tangential point. Each of the first distance and the second distance is equivalent to a minimum turning radius of the vehicle. The control system is communicatively coupled to the perception system, the path planning system, and the image acquisition units. The control system moves the vehicle from the current position by the determined linear distance along the X-axis to the start point by controlling one or more of a throttle and a brake of the vehicle.

Further, the control system moves the vehicle in a forward direction by accelerating and continuously adjusting a steering angle of the vehicle along a first curve path for reaching the middle point. Furthermore, the control system moves the vehicle in a reverse direction by accelerating and continuously adjusting the steering angle of the vehicle along a second curve path for reaching the tangential point. A radius of curvature of each of the first curve path and the second curve path corresponds to the minimum turning radius of the vehicle. Additionally, the control system moves the vehicle linearly by the determined vertical distance along the Y-axis into the vacant slot by controlling one or more of the throttle and the brake of the vehicle. The path planning system determines a longitudinal margin corresponding to a distance between the tangential point and the top boundary marking based on the minimum turning radius, a track width of the vehicle, a minimum safety margin, and a width of the vacant slot. The path planning system further identifies an X-coordinate and a Y-coordinate of the tangential point based on the determined longitudinal margin and the vertical distance between the destination point and the top boundary marking of the vacant slot. The designated area corresponds to a tight parking space. The vehicle moves linearly from the current position within the tight parking space along the X-axis to the start point without performing multiple back and forth movements or a space consuming long back and forth movement.

Furthermore, the path planning system determines a vertical offset between the collinear point and the start point based on a difference between a Y-coordinate of the current position and the Y-coordinate of the tangential point. Additionally, the path planning system determines the horizontal distance between the tangential point and the collinear point based on the minimum turning radius and the determined vertical offset. The path planning system computes an angle formed between a first line and a second line based on the determined horizontal distance and the minimum turning radius. The first line connects the center of the second imaginary circle to the center of the first imaginary circle. The second line connects the center of the second imaginary circle to the tangential point. The middle point is identified based on the computed angle, the minimum turning radius, and X-Y coordinates of the center of the second imaginary circle. The designated coordinate frame is an Odom coordinate frame. The navigation system is deployed in a land vehicle, an automobile, a boat, an airplane, a drone, or a robotic device.

BRIEF DESCRIPTION OF DRAWINGS

These and other features, aspects, and advantages of the claimed subject matter will become better understood when the following detailed description is read with reference to the accompanying drawings in which like characters represent like parts throughout the drawings, wherein:

DETAILED DESCRIPTION

The following description presents an exemplary system and associated method for vehicle navigation. Particularly, embodiments described herein disclose a navigation system that plans a path for a vehicle to automatically navigate from a current position to a target position within a designated area. Examples of the vehicle include automobiles, cars, trucks, drones, ships, airplanes, and robotic devices such as shopping carts, humanoid robots, industrial, and other robotic equipment.

It may be noted that different embodiments of the present vehicle navigation system may be used in many application areas. For example, in a drone-based package organizing application, the present navigation system may assist the drone to navigate within a warehouse and to identify vacant slots available within the warehouse for dropping packages, such that, the packages are organized efficiently without requiring any manual intervention. In another example, the present navigation system may be used in a car or a truck to identify obstacles in the surroundings of the vehicle and navigate safely within a designated area such as a parking space. The navigation system detects and selects a vacant parking slot in a parking space and plans a vehicle path from a current location of the vehicle to the selected parking slot in view of the identified obstacles.

Figure 1:
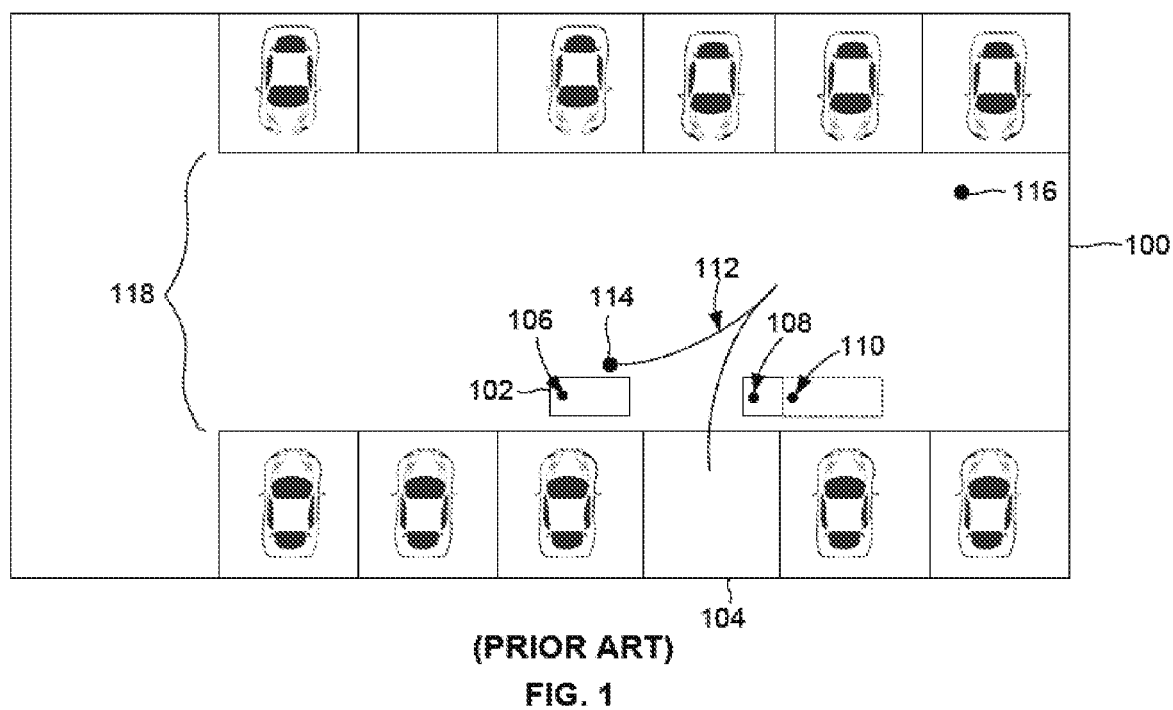
FIG. 1 is a schematic diagram illustrating an exemplary parking space, where a vehicle moves at a designated speed for detecting and selecting a vacant parking slot located therein.

As noted previously, certain autonomous vehicles use a Reeds-Shepp approach for determining the shortest path for automated parking. Autonomous vehicles utilizing the Reeds-Shepp approach often need to perform multiple turns and require a large distance in order to park themselves in identified vacant parking slots. For example, FIG. 1 is a schematic diagram illustrating an exemplary parking space (100), where a vehicle (102) moves at a designated speed for detecting and selecting a vacant parking slot (104) using Reeds-Shepp approach.

In real-world scenarios, the vehicle (102) navigating through the parking space (100) may identify the parking slot (104) as vacant when the vehicle (102) is located at a first position (106) before a starting point of the vacant slot (104). Alternatively, the vehicle (102) may identify the parking slot (104) as vacant when the vehicle (102) is located at a second position (108) at an end of the vacant slot (104). In yet another scenario, the vehicle (102) may identify the parking slot (104) as vacant when the vehicle (102) is located at a third position (110) after crossing the vacant slot (104).

When using Reeds-Shepp approach, a conventional navigation system will generate an optimal path (112) including an ideal start point (114) for the vehicle (102) to navigate to the identified parking slot (104). It may be noted from FIG. 1 that irrespective of whether the vehicle (102) is currently located in the first, second, or third position (106, 108, and 110), the vehicle (102) is laterally offset from the ideal start point (114). Hence, the vehicle (102) has to first navigate from the current position (106, 108, or 110) to the ideal start point (114) with desired heading, and only then follow the optimal path (112) provided as an output by the Reeds-Shepp approach. Navigation of the vehicle (102) from the current position (106, 108, or 110) to the ideal start point (114) may require multiple back and forth movements as the ideal start point (114) is laterally offset with respect to the current position (106, 108, or 110) of the vehicle (102). Performing multiple back and forth movements increases an overall time taken to park the vehicle, increases fuel consumption, and often proves difficult for inexperienced drivers.

As an alternative to performing multiple back and forth movements, the vehicle (102) may navigate forward, for example, to a position (116) in a parking aisle (118). Subsequently, the vehicle (102) may adjust an associated heading and move backwards to the ideal start point (114). However, such a long forward and backward movement to reach the ideal start point (114) requires a lot of space, which is not feasible when there is an obstacle, and is not suitable for a tight parking space. For example, the long forward and backward movement to reach the ideal start point (114) may be unsuitable when a parking aisle width is less than 4.9 meters.

Accordingly, the presently described navigation system enables a vehicle to park itself in a vacant slot without needing to perform multiple back and forth movements, especially in tight parking spaces. For clarity, the navigation system will be described herein with reference to autonomous parking of an automobile in a vacant parking slot with reference to FIG. 2.

Figure 2:
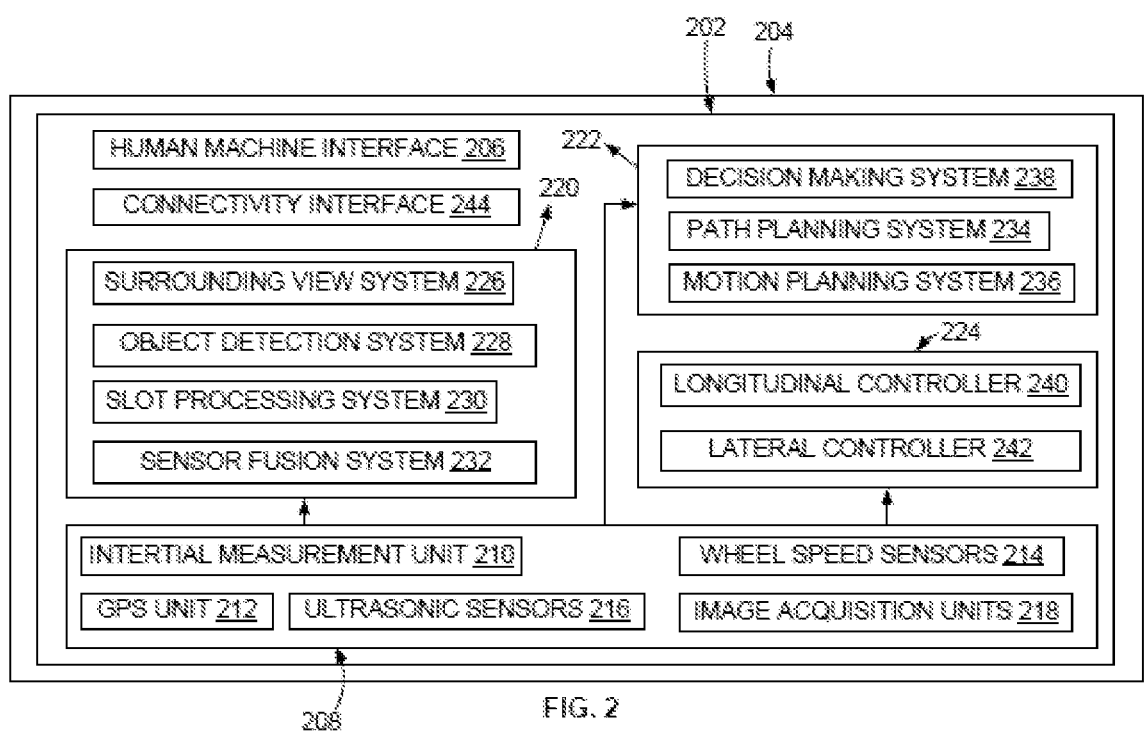
FIG. 2 is a block diagram illustrating an exemplary navigation system for automatically parking a vehicle in a vacant slot in a parking space, in accordance with aspects of the present disclosure.

FIG. 2 is a block diagram illustrating an exemplary navigation system (200) for automatically parking a vehicle (202) in a vacant slot in a designated area (204). An example of the designated area (204) is a tight parking space (204). In one embodiment, the vehicle (202) is a manually driven vehicle, a semi-autonomous vehicle, or an autonomous vehicle. In case of a semi-autonomous vehicle, a user drives the vehicle (202) to a target zone within the parking space (204). Subsequently, the user may activate the navigation system (200) in order to configure the vehicle (202) to park on its own. In one embodiment, the user may activate the navigation system (200) by pressing an activation button that is part of a human-machine interface (206) of the vehicle (202).

In case the vehicle (202) is an autonomous vehicle, the vehicle (202) identifies and drives itself to the target zone where vacant slots are available using one or more on-board sensors (208). Examples of such on-board sensors (208) include, an inertial measurement unit (210), a global positioning system (GPS) unit (212), one or more-wheel speed sensors (214), one or more ultrasonic sensors (216), and one or more image acquisition units (218).

In one embodiment, the IMU (210) includes one or more gyroscopes, accelerometers, and magnetometers. The IMU (210) identifies heading information of the vehicle (202). In certain embodiments, the GPS unit (212), the IMU (210), and the wheel speed sensors (214) identify a current location of the vehicle (202). In addition to the 114U (210), the GPS unit (212), and the wheel speed sensors (214), the on-board sensors (208) may also include the ultrasonic sensors (216) that detect various stationary and moving objects in the surroundings of the vehicle (202) and identify their distances to the vehicle (202).

Additionally, in certain embodiments, the on-board sensors (208) include the image acquisition units (218), such as, cameras (218) mounted onto the vehicle (202) for capturing one or more images of the surroundings of the vehicle (202) to detect various objects and/or obstacles in the surroundings. Further, the cameras (218) capture one or more images of the target zone. The navigation system (200) processes the one or more captured images using suitable image processing algorithms such as optical character recognition and/or pattern recognition algorithms, and detects if there are any parking signboards kept in the target zone. Upon detecting the parking signboards, the navigation system (200) identifies specific information mentioned on the parking signboards. For example, the navigation system (200) identifies symbols that indicate no parking zones, parking zones, directions to parking zones, and any texts mentioned in the parking signboards, for example, using the aforementioned algorithms. Upon determining that the vehicle (202) is entering a target parking zone, the navigation system (200) enables the vehicle to park itself in a vacant slot without requiring any user action.

To that end, the navigation system (200) is communicatively coupled to the one or more on-board sensors (208).

Specifically, the navigation system (200) includes a perception system (220), a planning system (222), and a control system (224). In one embodiment, these systems (220, 222, and 224) reside in one or more electronic control units (ECUs) of the vehicle (202). Accordingly, these systems (220, 222, and 224) may be implemented by suitable code on a processor-based system, such as a general-purpose or a special-purpose computer. Accordingly, these systems (220, 222, and 224), for example, include one or more general-purpose processors, specialized processors, graphical processing units, microprocessors, programming logic arrays, field programming gate arrays, integrated circuits, system on chips, and/or other suitable computing devices.

In certain embodiments, the perception system (220) includes a surrounding view system (226), an object detection system (228), a slot processing system (230), and a sensor fusion system (232). In one embodiment, these systems (226, 228, 230, and 232) may be implemented by suitable code on either a single system on a chip (SoC) or more than one SoCs depending upon computing capability of a SoC platform utilized in the vehicle (202). When the vehicle (202) navigates via a target zone within the parking space (204), the surrounding view system (226) dynamically receives one or more images of the surroundings captured by the cameras (218). The surrounding view system (226) stitches the received images to generate a stitched view that provides a bird's eye view of the surrounding environment for continuously perceiving the 360° environment around the vehicle (202).

The object detection system (228) receives the captured images from the cameras (218) and/or output signals from the ultrasonic sensors (216) and uses machine learning algorithms and/or artificial intelligence algorithms to process the received images for detecting objects in the surroundings of the vehicle (202). Examples of the algorithms used by the objection detection system (228) for detecting the surrounding objects include artificial neural networks, convolutional neural network, deep learning, inductive logic programming, support vector machines, clustering, Bayesian networks, reinforcement learning, representation learning, similarity and metric learning, genetic algorithms, rule-based machine learning, and learning classifier systems. Further, examples of objects detected in the surroundings using the previously noted algorithms include parked vehicles, concrete walls, and obstacles such as other vehicles and pedestrians located in parking aisles.

The slot processing system (230) identifies the presence of a vacant parking slot in the target zone within the parking space (204). To that end, the slot processing system (230) receives the stitched view generated by the surrounding view system (226). The slot processing system (230) then executes one or more image processing algorithms on the stitched view to detect boundary markings associated with each of a plurality of parking slots in the target zone.

The slot processing system (230) further identifies if the objects detected using the object detection system (228) lie within the boundary markings detected using the slot processing system (230). In certain embodiments, the slot processing system (230) identifies one or more parking slots as vacant when their corresponding boundary markings do not contain any objects detected using the object detection system (228). Further, the slot processing system (230) identifies a width of each of the vacant parking slots based on their corresponding boundary markings identified from the stitched view. The slot processing system (230) then selects a particular vacant parking slot whose associated width is greater than a width of the vehicle (202) for enabling successful parking of the vehicle (202) without any collision. The sensor fusion system (232) fuses outputs of the on-board sensors (208) such as the ultrasonic sensors (216) and the cameras (218) for detecting objects and/or obstacles in a path of the vehicle (202) when navigating to the selected vacant parking slot.

In certain embodiments, upon selecting a particular vacant parking slot in the target zone, the planning system (222) generates a reference path for the vehicle (202) to automatically navigate to the identified vacant slot. To that end, the planning system (222) includes a path planning system (234), a motion planning system (236), and a decision making system (238). In one embodiment, these systems (234, 236, and 238) may be implemented by suitable code on either a single system on a chip (SoC) or more than one SoCs depending upon computing capability of a SoC platform utilized in the vehicle (202).

In certain embodiments, the path planning system (234) generates a reference path to be followed by the vehicle (202) for moving from a current position within a target zone to a destination point within the selected vacant parking slot. Additionally, the motion planning system (236) generates velocity profiles defining one or more velocities at which the vehicle (202) has to move from the current position to the selected vacant parking slot via the reference path generated by the path planning system (234). Furthermore, the decision making system (238) outputs one or more maneuver decisions when the vehicle (202) moves to the selected vacant parking slot via the reference path generated by the path planning system (234). Examples of the maneuver decisions include a lane keep decision, a lane change decision, and a stop and go decision determined based on outputs of the sensor fusion system (232).

Specifically, in one embodiment, the path planning system (234) generates the reference path for the vehicle (202) based on state information associated with the vehicle (202) and information associated with the selected vacant parking slot. In certain embodiments, the state information associated with the vehicle (202) includes one or more of a current position or location within the target zone, acceleration, heading, and velocity information associated with the vehicle (202). Generation of the reference path for the vehicle (202) based on state information is described in detail with reference to FIGS. 3A-C and 4.

In real-world scenarios, the vehicle (202) may deviate and not exactly follow the reference path generated by the path planning system (234) while automatically navigating to the selected vacant parking slot. In such scenarios, the path planning system (234) generates a feasible smooth path for the vehicle (202) to return to the reference path from a deviated position. The path planning system (234) generates the smooth path using one or more conventional path control algorithms, which also output a desired vehicle heading required at each point in the generated smooth path.

Additionally, the motion planning system (236) generates velocity and position profiles that define one or more desired velocities at which the vehicle (202) has to navigate from one point to another point in the generated reference path. In one embodiment, the motion planning system (236) generates the velocity and position profiles, for example, based on one or more of the reference path, an object threat list generated based on sensor information captured using the ultrasonic sensors (216) and the cameras (218), and the maneuver decision provided by the decision making system (238).

In certain embodiments, upon generating the velocity and position profiles, the control system (224) in the navigation system (200) controls a throttle, a brake, and a steering angle of the vehicle (202) for automatically moving the vehicle (202) from the current position to the selected vacant parking slot via the reference path. To that end, the control system (224) includes a longitudinal controller (240) and a lateral controller (242) that control longitudinal motion and lateral motion of the vehicle (202), respectively.

Specifically, the longitudinal controller (240) controls longitudinal motion of the vehicle (202) by receiving one or more desired velocities at which the vehicle (202) has to move from one point to another point in the reference path from the motion planning system (236). Further, the longitudinal controller (240) receives current velocity of the vehicle (202) from the on-board sensors (208). In one embodiment, the longitudinal controller (240) is a proportional—integral—derivative controller, which dynamically computes an error between the one or more desired velocities and the current velocity, and adjusts the throttle and/or brake of the vehicle (202) for reaching a particular point in the reference path at the desired velocities.

Similarly, the lateral controller (242) controls lateral motion of the vehicle (202) by receiving a desired heading at which the vehicle (202) has to move from one point to another point in the reference path from the motion planning system (236). Further, the lateral controller (242) receives current heading information of the vehicle (202) from one or more of the on-board sensors (208). In one embodiment, the lateral controller (242) is a proportional—integral—derivative (PID) controller, which dynamically computes an error between the desired heading and the current heading, and accordingly controls a steering angle of the vehicle (202) for reaching a particular point in the reference path with the desired heading.

In one embodiment, the control system (224) in the navigation system (200) executes one or more corrective actions when the vehicle (202) fails to navigate to the selected vacant parking slot via the generated reference path. Examples of such corrective actions include stopping the vehicle (202), and/or switching from an automatic control mode to a manual control mode. In certain embodiments, the navigation system (200) is communicatively coupled to a connectivity interface (244). The connectivity interface (244) is used for receiving software updates from an external system, for example, a cloud system. The connectivity interface (244) is also used for receiving information on vacant slots from one or more sensors coupled to infrastructures of the parking space (204). An exemplary method employed for autonomous parking of the vehicle (202) in a vacant slot using the navigation system (200) is described in detail with reference to description of FIGS. 3A-C and 4.

Figure 3A:
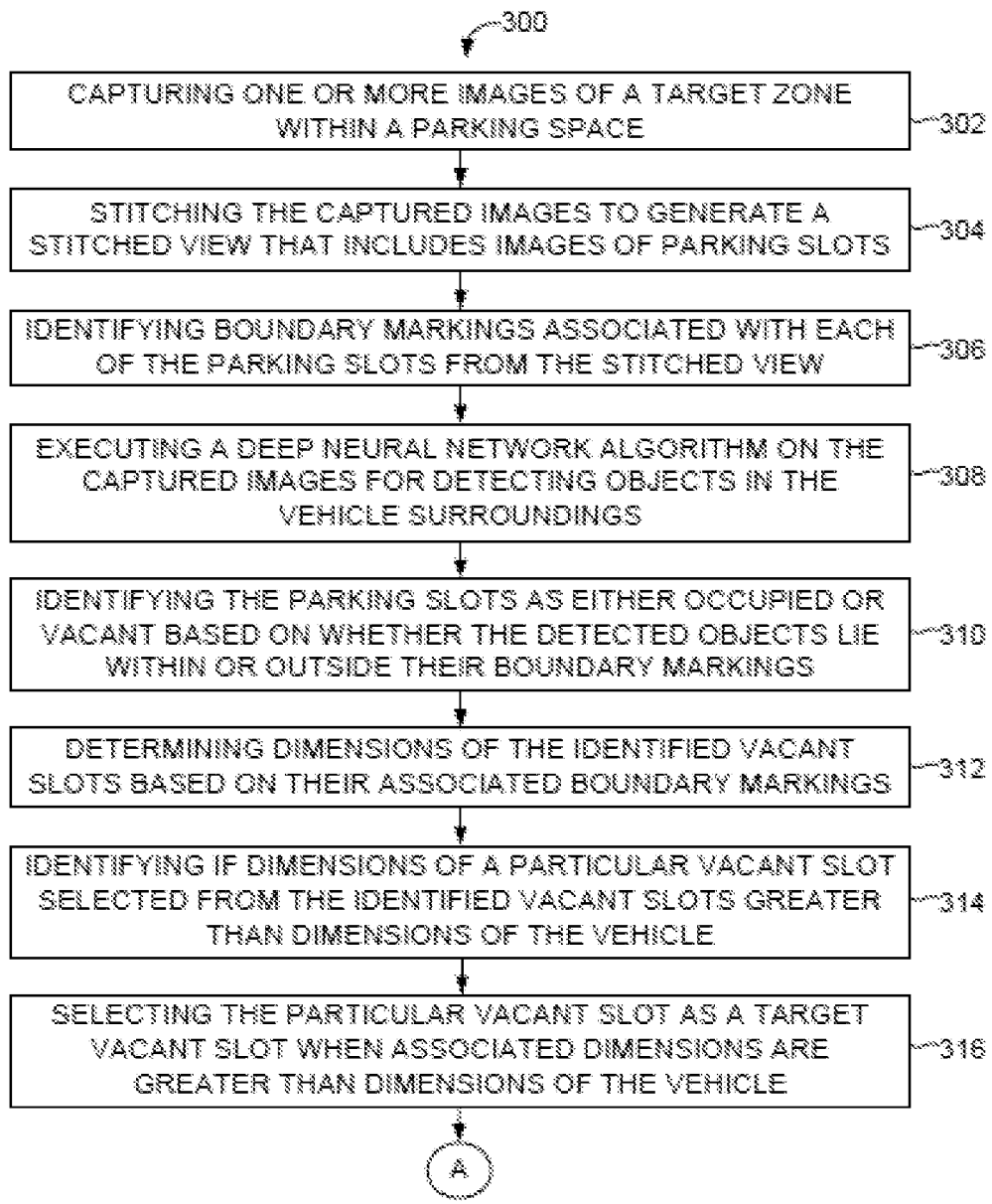
FIGS. 3A-C are flow diagrams illustrating an exemplary method for autonomous parking of the vehicle in an identified vacant slot using the navigation system of FIG. 2, in accordance with aspects of the present disclosure.
Figure 3B:
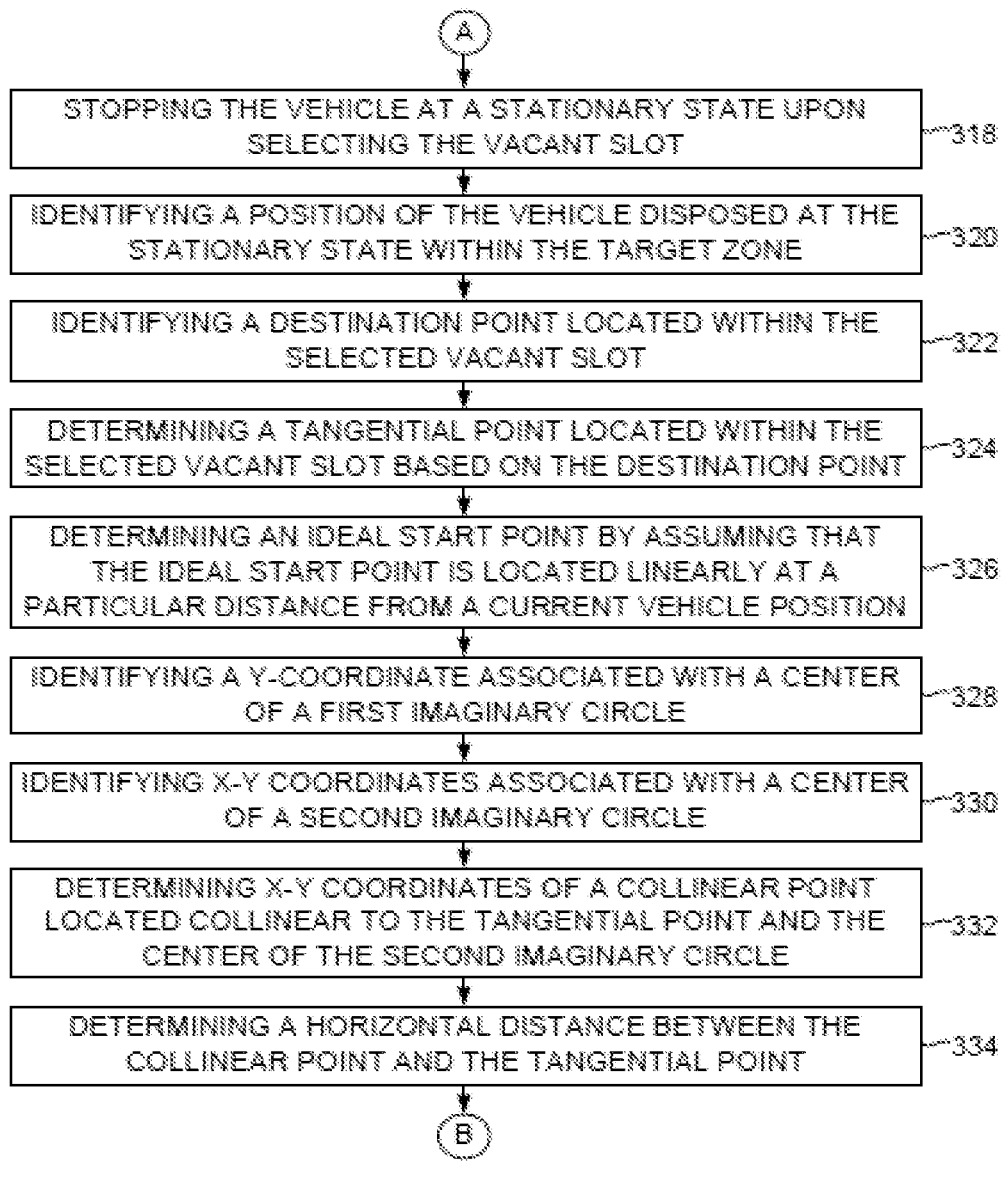
Figure 3C:
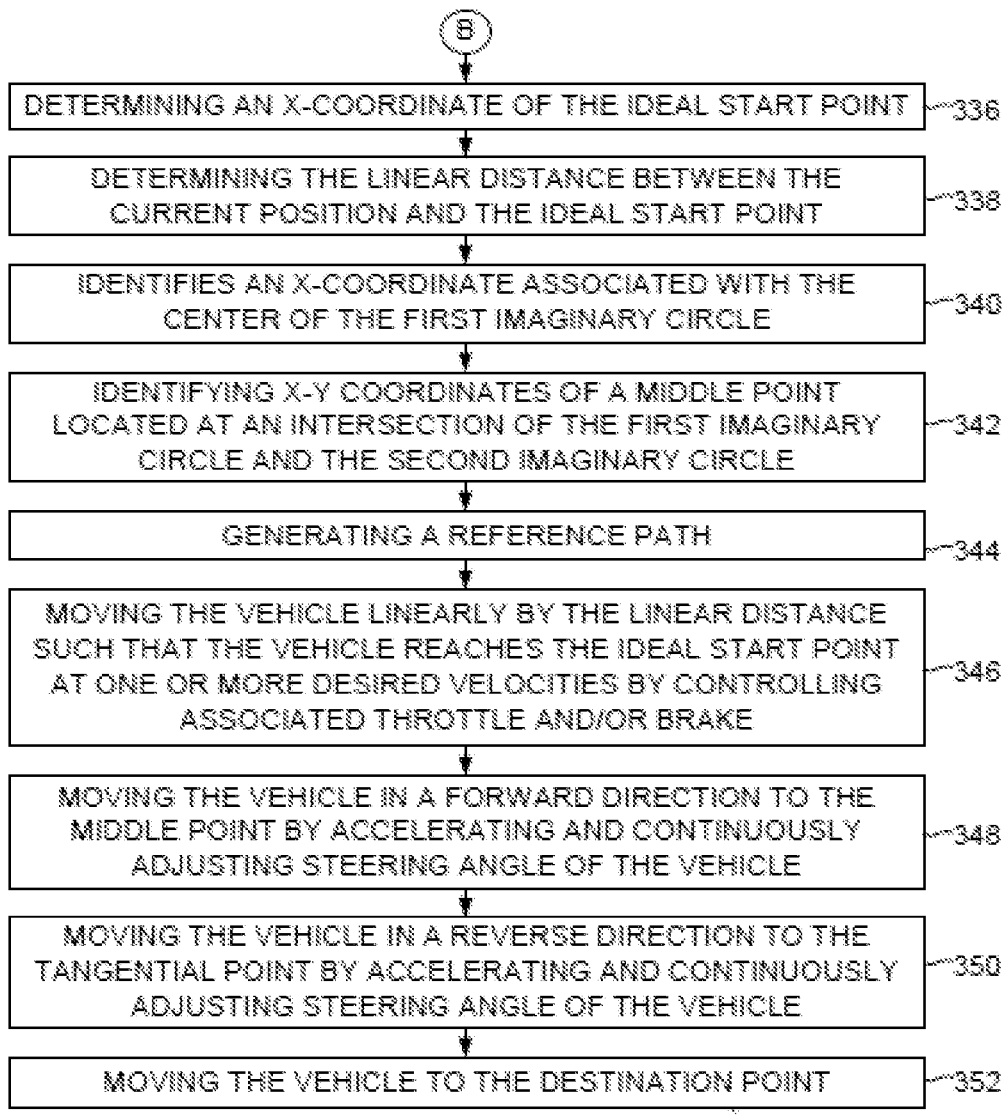

FIGS. 3A-C are flow diagrams illustrating an exemplary method (300) for autonomous parking of the vehicle (202) in an identified vacant slot using the navigation system (200) of FIG. 2. The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method or augmented by additional blocks with added functionality without departing from the spirit and scope of the subject matter described herein.

Figure 4:
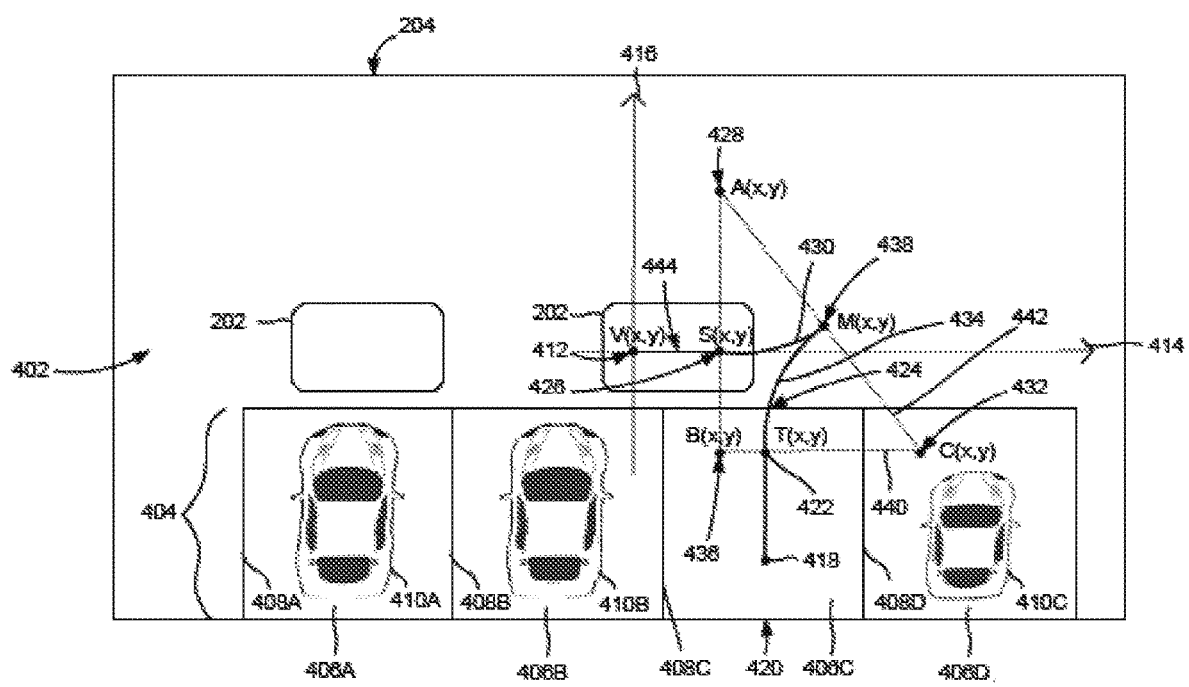
FIG. 4 is a schematic diagram illustrating an exemplary target zone within the parking space, where the vehicle moves at a designated speed for detecting and selecting a vacant parking slot using the navigation system of FIG. 2, in accordance with aspects of the present disclosure.

At step (302), the one or more image acquisition units (218) deployed on the vehicle (202) capture one or more images of a target zone within the parking space (204). In one embodiment, the image acquisition units (218) include a first camera coupled to a bonnet portion, a second camera coupled to a left outer rear view mirror (ORVM), a third camera coupled to a right ORVM, and a fourth camera coupled to a boot portion of the vehicle (202). In this embodiment, the second and third cameras are used to perform conventional functionalities of ORVMs including visualizing objects present behind and at sides of the vehicle (202) and to perform additional functionalities such as detection of objects at one or more blind-spot regions of the vehicle (202). As noted previously, these four cameras deployed on the vehicle (202) capture images of a target zone within the parking space (204). For example, FIG. 4 depicts an exemplary target zone (402) within the parking space (204) where the vehicle (202) moves at a designated speed for detecting and selecting a vacant parking slot. In one embodiment, the target zone (402) includes one or more parking rows disposed perpendicular to the movement of the vehicle (202). For simplicity, FIG. 4 depicts only one such parking row (404) including four parking slots that are labelled as (406A-D). However, it is to be understood that the target zone (402) can have any number of parking rows and corresponding parking spaces depending on a size of the parking space (204).

While the vehicle (202) moves via the target zone (402), the image acquisition units (218) capture one or images of the surroundings. At step (304), the surrounding view system (226) stitches the captured images to generate a stitched view that includes images of the parking slots (406A-D) in the target zone (402). At step (306), the slot processing system (230) identifies boundary markings (408A-D) associated with each of the parking slots (406A-D) from the stitched view. In one embodiment, the slot processing system (230) identifies square or rectangular boundary markings (408A-D) associated with each of the parking slots (406A-D) from the stitched view using one or more image processing algorithms.

As noted previously with reference to FIG. 3A, at step (308), the object detection system (228) executes a deep neural network algorithm on the captured images for detecting objects in the surroundings of the vehicle (202). At step (310), the slot processing system (230) identifies the parking slots (406A-D) as either occupied or vacant based on whether the detected objects lie within or outside their boundary markings (408A-D). For example, the slot processing system (230) identifies the parking slots (406A-B and 406D) as occupied when the object detection system (228) detects objects (410A-B and 410C) within the boundary makings (408A-B and 408D). Further, the slot processing system (230) identifies the parking slot (406C) as vacant when the object detection system (228) detects no objects within the boundary marking (408C) of the parking slot (406C).

At step (312), the slot processing system (230) determines dimensions of the identified vacant slots based on their associated boundary markings. For example, the slot processing system (230) determines dimensions such as a length and a width of the vacant slot (406C) from the associated boundary marking (408C) identified from the stitched view.

At step (314), the slot processing system (230) identifies if dimensions of a particular vacant slot selected from the identified vacant slots are greater than dimensions of the vehicle (202). At step (316), the slot processing system (230) selects that particular vacant slot as a target vacant slot when associated dimensions are greater than dimensions of the vehicle (202). For example, the slot processing system (230)

selects the vacant slot (406C) as a target vacant slot having associated dimensions greater than dimensions of the vehicle (202).

At step (318), the control system (224) stops the vehicle (202) at a stationary state upon selecting the vacant slot (406C). At step (320), the path planning system (234) identifies a position of the vehicle (202) disposed in the stationary state within the target zone (402). In certain embodiments, the path planning system (234) identifies the position of the vehicle (202) with reference to a midpoint of a rear axle of the vehicle (202) and in a designated coordinate frame. An example of the designated coordinate frame is an Odom coordinate frame. The Odom coordinate frame is a world-fixed frame. A pose of the vehicle (202) in the Odom coordinate frame drifts over time without any bounds. Further, in the Odom coordinate frame, an initial position of the vehicle (202) defines an origin of the Odom coordinate frame.

For example, the position of the vehicle (202) disposed in the stationary state post selection of the vacant slot (406C) is labelled as (412) in FIG. 4. The position (412) represents the midpoint of the rear axle of the vehicle (202) and the origin of the Odom coordinate frame, which includes corresponding axes such as an X-axis (414) and a Y-axis (416). For simplicity, the position (412) is subsequently described as a current position (412) of the vehicle (202).

Referring back to FIG. 3B, post identifying the current position (412) of the vehicle (202), at step (322), the path planning system (234) identifies a destination point (418) located within the selected vacant slot (406C) based on dimensions of the selected vacant slot (406C). For example, a length and a width of the selected vacant slot (406C) determined using one or more image processing algorithms correspond to 5 meters and 2.5 meters, respectively. In this example, the path planning system (234) identifies that the destination point (418) is located vertically at a distance of 1.5 meters from a midpoint of a bottom boundary marking (420) of the vacant slot (406C).

At step (324), the path planning system (234) determines a tangential point (422) located within the selected vacant slot (406C) based on the identified destination point (418). In one embodiment, the path planning system (234) determines the tangential point (422) based on a vertical distance between the destination point (418) and a top boundary marking (424) associated with the vacant slot (406C), and a longitudinal margin using equation (1):

$$dt = Lpf - dm \qquad (1)$$

where, 'dt' corresponds to a vertical distance between the destination point (418) and the tangential point (422), 'Lpf' corresponds to the vertical distance between the destination point (418) and the top boundary marking (424), and 'dm' corresponds to the longitudinal margin representing a vertical distance between the tangential point (422) and the top boundary marking (424).

In one embodiment, the path planning system (234) determines a value associated with 'Lpf' by using one or more image processing algorithms to process an image having the boundary markings (408C) of the vacant slot (406C) clearly visible. Further, the path planning system (234) determines a value associated with 'dm' using equation (2):

$$dm = \sqrt{\left(R - \frac{tw}{2} - Cmgn\right)^2 - \left(R - \frac{Wp}{2}\right)^2} \qquad (2)$$

where, 'R' corresponds to a minimum turning radius of the vehicle (202), 'tw' corresponds to a track width of the vehicle (202), 'Wp' corresponds to a width of the selected vacant slot (406C), and a 'Cmgn' corresponds to a minimum safety margin.

In one embodiment, the minimum safety margin defines a minimum distance to be maintained by the vehicle (202) with reference to objects (410B-C) parked in adjacent slots (406B and 406D) to prevent collision when moving into the selected vacant slot (406C). The vehicle (202) may store a preselected value of the minimum safety margin in an associated database (not shown in FIGS).

As noted previously, conventional navigation systems utilizing Reeds-Shepp approach determine an ideal start point that is laterally offset with reference to a current position of the vehicle in a target zone. Hence, the vehicle has to perform multiple back and forth movements or perform a long forward and backward movement to move to the ideal start point, which requires more space and is not suitable for tight parking spaces. In contrast, the present navigation system (200) determines the ideal start point that is linearly (not laterally) offset with reference to the current position of the vehicle. Upon determining the ideal start point, the navigation system (200) moves the vehicle linearly to the ideal start point without requiring the vehicle (202) to perform the conventional multiple back and forth movements or the long forward and backward movement, which significantly saves the space required for successfully parking the vehicle (202) into the vacant slot (406C). Accordingly, the presently described navigation system (200) is especially useful for parking the vehicle (202) in tight parking spaces.

Specifically, at step (326), the path planning system (234) determines the ideal start point (426) by assuming that the ideal start point (426) is located linearly at a particular distance from the current position (412) of the vehicle (202), for example, using equations (3) and (4):

$$Sx = Vx + d \qquad (3)$$

$$Sy = Vy \qquad (4)$$

where, 'Sx' and 'Sy' correspond to X and Y coordinates of the ideal start point (426), 'Vx' and 'Vy' correspond to X and Y coordinates of the current position (412) of the vehicle (202), and 'd' corresponds to a linear distance between the current position (412) of the vehicle (202) and the ideal start point (426).

It may be noted that the path planning system (234) only assumes that the ideal start point (426) is located linearly at a certain distance from the current position (412) and an actual value of the assumed distance is not yet determined by the path planning system (234). In order to determine the actual value of the assumed distance, the path planning system (234) identifies centers of first and second imaginary circles whose intersection defines a middle point (438) of a reference path (444), and a collinear point (436) that is collinear to the tangential point (422) and to a center of one of the first and second imaginary circles. Accordingly, the path planning system (234) identifies centers of the first and second imaginary circles and the collinear point for determining the actual value of the assumed distance as described in detail in subsequent steps from (328) to (338).

Specifically, at step (328), the path planning system (234) identifies a Y-coordinate associated with a center (428) of a first imaginary circle (430). In one embodiment, the path planning system (234) identifies the Y-coordinate of the center (428) using equation (5):

$$Ay = Vy + Rmin \qquad (5)$$

where, 'Ay' corresponds to the Y-coordinate of the center (428), 'Vy' corresponds to the Y-coordinate of the current position (412) of the vehicle (202), and 'Rmin' corresponds to a minimum turning radius of the vehicle (202).

At step (330), the path planning system (234) identifies X-Y coordinates associated with a center (432) of a second imaginary circle (434). In one embodiment, the path planning system (234) identifies the X-Y coordinates of the center (432) using equations (6) and (7):

$$Cx = Tx + Rmin \quad (6)$$

$$Cy = Ty \quad (7)$$

where, 'Cx' and 'Cy' correspond to X and Y coordinates of the center (432), 'Tx' and 'Ty' correspond to X and Y coordinates of the tangential point (422), and 'Rmin' corresponds to the minimum turning radius of the vehicle (202).

Further, at step (332), the path planning system (234) determines X-Y coordinates of a collinear point (436) located collinear to the tangential point (422) and the center (432) of the second imaginary circle (434). In one embodiment, the path planning system (234) determines X-Y coordinates of the collinear point (436) using coordinates of the ideal start point (426) and the tangential point (422) using equations (8) and (9):

$$Bx = Sx \quad (8)$$

$$By = Vy - Ty \quad (8)$$

where, 'Bx' and 'By' correspond to X and Y coordinates of the collinear point (436), Sx' corresponds to an X-coordinate of the ideal start point (426), 'Vy' corresponds to a Y-coordinate of the current position (412) of the vehicle (202), and 'Ty' corresponds to a Y-coordinate of the tangential point (422).

At step (334), the path planning system (234) determines a horizontal distance between the collinear point (436) and the tangential point (422). Specifically, the path planning system (234) determines the horizontal distance (represented as 'BT' in FIG. 4) based on the ideal start point (426) (represented as 'S'), the center (428) (represented as 'A'), the center (432) (represented as 'C'), the collinear point (436) (represented as 'B'), and the tangential point (422) (represented as 'T') using equations (10)-(18):

$$AB = AS + SB \quad (10)$$

$$BC = BT + TC \quad (11)$$

$$AC = AM + MC \quad (12)$$

$$AS = AM = MC = TC = Rmin \quad (13)$$

$$SB = Vy - Ty \quad (14)$$

$$AC^2 = AB^2 + BC^2 \quad (15)$$

$$(AM + MC)^2 = (AS + SB)^2 + (BT + TC)^2 \quad (16)$$

$$(2Rmin)^2 = (Rmin + SB)^2 + (BT + Rmin)^2 \quad (17)$$

$$BT = \sqrt{3Rmin^2 - 2Rmin*SB - SB^2} - Rmin \quad (18)$$

where, 'BT' corresponds to the horizontal distance between the collinear point (436) and the tangential point (422), 'SB' corresponds to a vertical offset between the ideal start point (426) and the collinear point (436), and 'Rmin' corresponds to the minimum turning radius of the vehicle (202).

Upon determining the horizontal distance, at step (336), the path planning system (234) determines an X-coordinate of the ideal start point (426) based on X-coordinates of the tangential point (422) and the ideal start point (426) using equation (19):

$$Sx = Tx - BT \quad (19)$$

where, 'Sx' corresponds to the X-coordinate of the ideal start point (426), 'Tx' corresponds to the X-coordinate of the tangential point (422), and 'BT' corresponds to the determined horizontal distance.

At step (338), the path planning system (234) determines the linear distance between the current position (412) and the ideal start point (426) based on X-coordinates of the ideal start point (426) and the current position (412) using equation (20):

$$d = Sx - Vx \quad (20)$$

where 'd' corresponds to the linear distance, 'Sx' corresponds to the X-coordinate of the ideal start point (426), and 'Vx' corresponds to the X-coordinate of the current position (412).

At step (340), the path planning system (234) identifies an X-coordinate associated with the center (428) of the first imaginary circle (430). In one embodiment, the path planning system (234) identifies the X-coordinate using equation (21):

$$Ax = Sx \quad (21)$$

where, 'Ax' corresponds to the X-coordinate of the center (428), and 'Sx' corresponds to the X-coordinate of the ideal start point (426).

At step (342), the path planning system (234) identifies X-Y coordinates of a middle point (438) located at an intersection of the first imaginary circle (430) and the second imaginary circle (434). The path planning system (234) identifies X-Y coordinates of the middle point (438) using equations (22)-(24):

$$\theta = \sin^{-1}\left(\frac{Rmin + BT}{Rmin}\right) \quad (22)$$

$$Mx = Cx - Rmin * \cos\theta \quad (23)$$

$$My = Cy + Rmin * \sin\theta \quad (24)$$

where, 'θ' corresponds to an angle formed between a first imaginary line (440) and a second imaginary line (442), where the first imaginary line (440) connects the center (432) and the tangential point (422), and the second imaginary line (442) connects the center (432) and the center (428). 'Mx' corresponds to an X-coordinate of the middle point (438), and 'My' corresponds to a Y-coordinate of the middle point (438).

At step (344), the path planning system (234) generates a reference path (444) for autonomous parking of the vehicle (202). In one embodiment, the path planning system (234) generates the reference path (444) using the determined ideal start point (426), middle point (438), tangential point (422), and destination point (418). At step (346), the longitudinal controller (240) provides control instructions to the control system (224) to move the vehicle (202) linearly along the X-axis (414) from the current position (412) by the determined linear distance such that the vehicle (202) reaches the ideal start point (426) at one or more desired velocities controlled using throttle and/or brake of the vehicle (202). In one embodiment, the longitudinal controller (240) provides control instructions to move the vehicle (202) linearly forward by the linear distance when a value associated with the linear distance is greater than zero. Alternatively, the longitudinal controller (240) provides control instructions to move the vehicle (202) linearly in a rearward direction when the value associated with the linear distance is less than zero.

At step (348), the lateral controller (242) provides control instructions to the control system (224) to move the vehicle (202) in a forward direction from the ideal start point (426) to the middle point (438) by accelerating and continuously adjusting steering angle of the vehicle (202). Specifically, in one embodiment, the lateral controller (242) provides control instructions to move the vehicle (202) to the middle point (438) via a first curved path whose radius of curvature is equivalent to the minimum turning radius of the vehicle (202). Hence, in-real world scenarios, the vehicle (202) can easily follow the first curved path and reach the middle point (438) with desired heading by moving in a forward direction.

At step (350), the lateral controller (242) provides control instructions to the control system (224) to move the vehicle (202) in a reverse direction from the middle point (438) to the tangential point (422) by accelerating and continuously adjusting steering angle of the vehicle (202). Specifically, in one embodiment, the lateral controller (242) provides control instructions to move the vehicle (202) to the tangential point (422) via a second curve path whose radius of curvature is equivalent to the minimum turning radius of the vehicle (202). Hence, in-real world scenarios, the vehicle (202) can easily follow the second curved path and reach the tangential point (422) with desired heading by moving in a rearward direction.

Subsequently, at step (352), the longitudinal controller (240) provides control instructions to the control system (224) to move the vehicle (202) from the tangential point (422) to the destination point (418). In one embodiment, the longitudinal controller (240) provides control instructions to move the vehicle (202) to the destination point (418) by vertically moving the vehicle (202) along the Y-axis (416) by the distance determined using the previously noted equation (1) such that the vehicle (202) is successfully parked in the selected vacant slot (406C).

Figure 5:
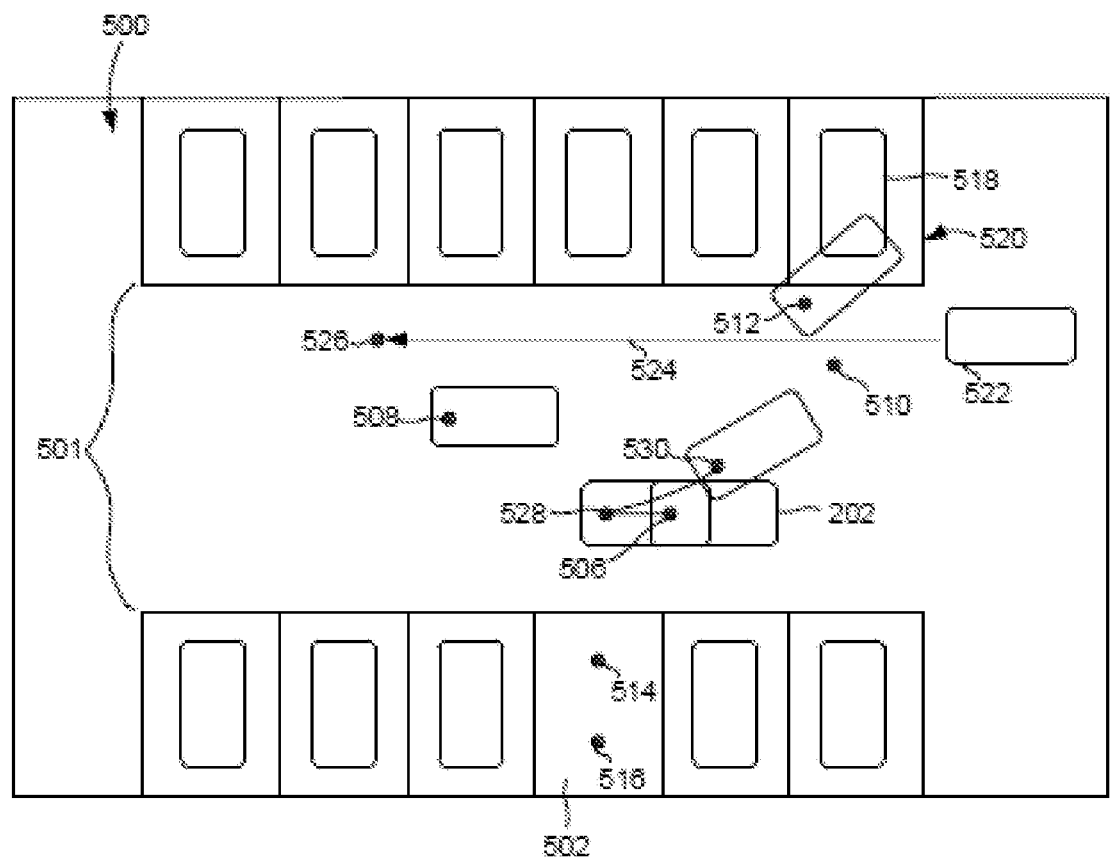
FIG. 5 is a schematic diagram illustrating an exemplary target zone within a stringent parking space that includes a vacant parking slot selected by the vehicle for automated parking.

An exemplary method described previously using the steps 302 to 352 enables the vehicle (202) to safely and automatically park itself even in a tight parking space. For example, FIG. 5 is a schematic diagram illustrating a target zone (500) in a tight parking space having a parking aisle (501) and a vacant slot (502) selected by the vehicle (202) for automated parking. In an exemplary implementation, the width of the parking aisle (501) corresponds to 4.5 meters (m), a length of the vehicle (202) corresponds to 3.765 m, a width of the vehicle (202) corresponds to 1.677 m, and a height of the vehicle (202) corresponds to 1.535 m. However, in another embodiment, the width of the parking aisle (501) may range between 4.5-7.5 m, and the length, width, and height of the vehicle (202) may range between 3.765-4-2 m, 1.677-1.8 m, and 1.4-1.535 m, respectively. In one embodiment, the vehicle (202) identifies the presence of the vacant slot (502) using the image acquisition units (218) when the vehicle (202) is located in a current position (506) in the target zone (500). Further, the vehicle (202) selects the vacant slot (502) for automated parking.

In the previously noted example, upon selecting the vacant slot (502) for automated parking, a conventional navigation system utilizing the Reeds-Shepp approach identifies an ideal start point (508) that is laterally offset from the current position (506) of the vehicle (202). Subsequently, the vehicle (202) moves from the current position (506), for example, to an intermediate point (510) in a forward direction and subsequently reaches the ideal start point (508) by moving in a reverse direction. An example distance by which the vehicle (202) moves from the current position (506) to the ideal start point (508) via the intermediate point (510) varies between 4 to 5 meters.

Further, in the conventional navigation system, upon reaching the ideal start point (508), the vehicle (202) moves to a middle point (512) identified using the Reeds-Sheep approach. An example distance from the ideal start point (508) to the middle point (512) varies between 4.5 to 7.5 meters. Subsequently, the vehicle (202) moves from the middle point (512) to a tangential point (514) located at a distance of, for example, 4.5 to 6 meters from the middle point (512). Finally, the vehicle (202) parks itself in the vacant slot (502) by linearly moving a distance of, for example, 3 meters from the tangential point (514) to a destination point (516).

It may be noted from FIG. 5 that when the vehicle (202) moves from the current position (506) to the intermediate point (510) and from the ideal start point (508) to the middle point (512), the vehicle (202) may possibly collide with another vehicle (518) already parked in a parking row (520). Conventionally such a collision is avoided by re-planning a path of the vehicle (202), which increases an overall time required for parking the vehicle (202) and involves multiple turns that are difficult to perform especially if the vehicle (202) is of a level-zero, a level-one, or a level-two autonomous vehicle type.

Further, in some scenarios, the vehicle (202) utilizing the conventional navigation system cannot perform automated parking uninterruptedly. For example, in a particular scenario, the vehicle (202), currently located in the ideal start point (508), identifies an oncoming vehicle (522) using associated on-board sensors. In this example, the vehicle (202) having a conventional navigation system terminates the parking activity. The vehicle (202) then waits for the oncoming vehicle (522) moving in a particular direction (524) to reach a position (526) at a predefined safe distance in the parking aisle (501), to avoid collision.

However, in the same scenario, the vehicle (202) utilizing the present navigation system (200) can perform automated parking uninterruptedly. This is because the navigation system (200) identifies an ideal start point (528) that is linearly (not laterally) offset with reference to the current position (506) of the vehicle (202). In comparison to the conventional navigation system, the vehicle (202) reaches the ideal start point (528) from the current position (506) without making any turns, which provides an improved ease of maneuvering and substantially reduces efforts required to reach the ideal start point. Further, a distance from the current position (506) to the ideal start point (528) identified using the navigation system (200), for example, is at a distance of 1 to 2 meters, which is substantially lesser than the 4.5-6 meters distance identified between (506) and (508) using the conventional navigation system. Hence, in real-world scenarios, the vehicle (202) has to move only linearly and relatively a shorter distance of, for example, 1 to 2 meters to reach the ideal start point (528).

Further, it may be noted from FIG. 5 that a middle point (530) identified using the navigation system (200) is different from the middle point (512) identified using the conventional navigation system. Specifically, the middle point (530) identified using the navigation system (200) is located closer to the ideal start point (528) and is not located closer to the parking row (520). Hence, as shown in FIG. 5, while the oncoming vehicle (522) is moving in the particular direction (524) towards the exemplary position (526), the navigation system (200) can simultaneously perform the parking activity by moving the vehicle (202) from the ideal start point (528) to the middle point (530). The vehicle (202) neither needs to stop the parking activity nor needs to wait for the oncoming vehicle (522) to reach the exemplary position (526). Thus, the present navigation system (200) performs automated parking of the vehicle (202) uninterruptedly and quickly even with the presence of a moving object in a small-sized parking aisle.

As noted previously, a conventional navigation system utilizing the Reeds-Shepp approach determines the ideal start point (114), which is laterally offset with respect to a current position of the vehicle (202). Hence, the vehicle (202) has to perform multiple back and forth movements to move to the ideal start point (114) itself. In contrast, the navigation system (200) described in the present disclosure determines that the ideal start point (426) is linearly present along the X-axis (414) of the Odom coordinate frame at a particular distance from the current position (412) of the vehicle (202). The vehicle (202) has to merely move straight by the particular distance to reach the ideal start point (426). Thus, the present navigation system (200) prevents the need for performing multiple back and forth movements, which decreases an overall time taken to park the vehicle, decreases fuel consumption, and provides a simplistic path for inexperienced drivers.

Further, the conventional navigation system utilizing the Reeds-Shepp approach is not suitable for tight parking spaces having parking aisles width less than 4.9 meters. However, even in such tight parking spaces, the present navigation system (200) enables the vehicle (202) to successfully park itself in an identified vacant slot as the vehicle (202) has to merely move straight by a particular distance to reach the ideal start point (426) without needing to perform a long forward and backward movement described previously. Further, the navigation system (200) determines a value associated with the particular distance using the minimum turning radius of the vehicle (202), which ensures that the vehicle (202) moves the shortest distance possible to reach the ideal start point (426) in real-world scenarios. Further, the navigation system (200) enables the vehicle (202) to identify a vacant slot and generate a reference path to the identified vacant slot for different types of vehicles irrespective of their types and models.

Although specific features of various embodiments of the present systems and methods may be shown in and/or described with respect to some drawings and not in others, this is for convenience only. It is to be understood that the described features, structures, and/or characteristics may be combined and/or used interchangeably in any suitable manner in the various embodiments shown in the different figures.

While only certain features of the present systems and methods have been illustrated and described herein, many modifications and changes will occur to those skilled in the art. It is, therefore, to be understood that the appended claims are intended to cover all such modifications and changes as fall within the true spirit of the claimed invention.

LIST OF NUMERAL REFERENCES:

| | |
|---|---|
| 100, 204 Parking Space | 234 Path Planning System |
| 102, 202, 518, 522 Vehicle | 236 Motion Planning System |
| 104, 406A-D, 502 Parking Slots | 238 Decision Making System |
| 106, 108, 110, 116, 526 Vehicle Positions | 240 Longitudinal Controller |
| 112 Optimal Path | 242 Lateral Controller |
| 114, 426, 508, 528 Ideal Start Point | 244 Connectivity Interface |
| 118, 501 Parking Aisle | 300 Flowchart Depicting Method for Autonomous Parking of a Vehicle |
| 200 Navigation System | 302-352 Steps of Method for Autonomous Parking of a Vehicle |
| 206 Human-Machine Interface | 408A-D Boundary Markings |
| 208 On-board Sensors | 410A-C Objects |
| 210 Inertial Measurement Unit | 412, 506 Current Vehicle Position |
| 212 Global Positioning System | 414, 416 X-Y axes of Odom Coordinate |
| 214 Wheel Speed Sensors | 418, 516 Destination Point |
| 216 Ultrasonic Sensors | 420 Bottom Boundary Marking |
| 218 Image Acquisition Units | 422, 514 Tangential Point |
| 402, 500 Target Zone | 424 Top Boundary Marking |
| 404, 520 Parking Row | 428, 432 Centers of Imaginary Circles |
| 220 Perception System | 430, 434 Imaginary Circles |
| 222 Planning System | 436 Collinear Point |
| 224 Control System | 438, 512, 530 Middle Point |
| 226 Surrounding View System | 440, 442 Imaginary Lines |
| 228 Object Detection System | 444 Reference Path |
| 230 Slot Processing System | 510 Intermediate Point |
| 232 Sensor Fusion System | 524 Oncoming Vehicle Direction |

The invention claimed is:

1. A method for navigation of a vehicle, comprising:
identifying a vacant slot in a designated area using one or more images acquired by one or more image acquisition units deployed on the vehicle when navigating within the designated area;
stopping the vehicle at a current position within the designated area upon identifying the vacant slot, wherein the current position represents an origin of a designated coordinate frame comprising an X-axis and a Y-axis;
determining a vertical distance between a destination point located within the vacant slot and a top boundary marking of the vacant slot, a tangential point located within the vacant slot, a start point located along the X-axis at a linear distance from the current position, and a collinear point located along the X-axis at a horizontal distance from the tangential point using the one or more images;

determining the linear distance between the current position and the start point along the X-axis based on the horizontal distance between the tangential point and the collinear point and one or more coordinates of the tangential point, the start point, and the current position;

identifying a middle point that is at an intersection of a first imaginary circle and a second imaginary circle, wherein a center of the first imaginary circle is located along the Y-axis at a first distance from the start point, wherein a center of the second imaginary circle is located along the X-axis at a second distance from the tangential point, wherein each of the first distance and the second distance is equivalent to a minimum turning radius of the vehicle;

moving the vehicle from the current position by the determined linear distance along the X-axis to the start point by controlling one or more of a throttle and a brake of the vehicle using a control system;

moving the vehicle in a forward direction by accelerating and continuously adjusting a steering angle of the vehicle along a first curve path for reaching the middle point;

moving the vehicle in a reverse direction by accelerating and continuously adjusting the steering angle of the vehicle along a second curve path for reaching the tangential point, wherein a radius of curvature of each of the first curve path and the second curve path corresponds to the minimum turning radius of the vehicle; and moving the vehicle linearly by the determined vertical distance along the Y-axis into the vacant slot by controlling one or more of the throttle and the brake of the vehicle using the control system;

wherein the method further comprises:
processing one or more of the acquired images by a perception system to identify boundary markings of the vacant slot from the acquired images;
identifying dimensions of the vacant slot based on the boundary markings identified from the acquired images;
identifying the destination point located within the vacant slot based on the identified dimensions of the vacant slot; and
identifying an X-coordinate and a Y-coordinate of the tangential point based on a longitudinal margin and the vertical distance between the destination point and the top boundary marking of the vacant slot, wherein the longitudinal margin is determined based on the minimum turning radius, a track width of the vehicle, a preselected minimum safety margin, and a width of the vacant slot,
wherein the designated area corresponds to a parking space having an associated parking aisle width that is less than 4.5 meters, wherein the vehicle moves linearly from the current position within the tight parking space along the X-axis to the start point without performing multiple back and forth movements or without performing a single back and forth movement covering a distance larger than a determined distance between a current position and an intermediate position computed using Reeds Shepp method.

2. The method as claimed in claim 1, wherein the method further comprises determining the horizontal distance between the tangential point and the collinear point based on the minimum turning radius and a vertical offset between the collinear point and the start point.

3. The method as claimed in claim 2, wherein the method further comprises determining the vertical offset between the collinear point and the start point based on a difference between a Y-coordinate of the current position and the Y-coordinate of the tangential point.

4. The method as claimed in claim 2, wherein the method further comprises computing an angle formed between a first line and a second line based on the determined horizontal distance and the minimum turning radius, wherein the first line connects the center of the second imaginary circle to the center of the first imaginary circle, wherein the second line connects the center of the second imaginary circle to the tangential point, wherein the middle point is identified based on the computed angle, the minimum turning radius, and X-Y coordinates of the center of the second imaginary circle, and wherein the designated coordinate frame is an Odom coordinate frame.

5. A navigation system associated with a vehicle, comprising:
a perception system comprising one or more image acquisition units deployed on the vehicle, wherein the perception system identifies a vacant slot in a designated area using one or more images acquired by the image acquisition units when the vehicle navigates within the designated area, wherein the vehicle stops at a current position within the designated area upon identifying the vacant slot, wherein the current position represents an origin of a designated coordinate frame comprising an X-axis and a Y-axis;
a path planning system communicatively coupled to the perception system and the image acquisition units, wherein the path planning system:
determines a vertical distance between a destination point located within the vacant slot and a top boundary marking of the vacant slot, a tangential point located within the vacant slot, a start point located along the X-axis at a linear distance from the current position, and a collinear point located along the X-axis at a horizontal distance from the tangential point using the one or more images;
determines the linear distance between the current position and the start point along the X-axis based on the horizontal distance between the tangential point and the collinear point and one or more coordinates of the tangential point, the start point, and the current position;
identifies a middle point that is at an intersection of a first imaginary circle and a second imaginary circle, wherein a center of the first imaginary circle is located along the Y-axis at a first distance from the start point, wherein a center of the second imaginary circle is located along the X-axis at a second distance from the tangential point, wherein each of the first distance and the second distance is equivalent to a minimum turning radius of the vehicle;
determines a longitudinal margin corresponding to a distance between the tangential point and the top boundary marking based on the minimum turning radius, a track width of the vehicle, a minimum safety margin, and a width of the vacant slot; and
identifies an X-coordinate and a Y-coordinate of the tangential point based on the determined longitudinal margin and the vertical distance between the destination point and the top boundary marking of the vacant slot, wherein the designated area corresponds to a tight parking space, wherein the vehicle moves linearly from the current position within the tight parking space along the X-axis to the start point without performing multiple back and forth movements or a space consuming long back and forth movement; and a control system communicatively coupled to the perception system, the path planning system, and the image acquisition units, wherein the control system:

moves the vehicle from the current position by the determined linear distance along the X-axis to the start point by controlling one or more of a throttle and a brake of the vehicle;

moves the vehicle in a forward direction by accelerating and continuously adjusting a steering angle of the vehicle along a first curve path for reaching the middle point;

moves the vehicle in a reverse direction by accelerating and continuously adjusting the steering angle of the vehicle along a second curve path for reaching the tangential point, wherein a radius of curvature of each of the first curve path and the second curve path corresponds to the minimum turning radius of the vehicle; and moves the vehicle linearly by the determined vertical distance along the Y-axis into the vacant slot by controlling one or more of the throttle and the brake of the vehicle.

6. The navigation system as claimed in claim 5, wherein the path planning system further:

determines a vertical offset between the collinear point and the start point based on a difference between a Y-coordinate of the current position and the Y-coordinate of the tangential point; and determines the horizontal distance between the tangential point and the collinear point based on the minimum turning radius and the determined vertical offset.

7. The navigation system as claimed in claim 6, wherein the path planning system further computes an angle formed between a first line and a second line based on the determined horizontal distance and the minimum turning radius, wherein the first line connects the center of the second imaginary circle to the center of the first imaginary circle, wherein the second line connects the center of the second imaginary circle to the tangential point, wherein the middle point is identified based on the computed angle, the minimum turning radius, and X-Y coordinates of the center of the second imaginary circle, and wherein the designated coordinate frame is an Odom coordinate frame.

8. The navigation system as claimed in claim 5, wherein the navigation system is deployed in a land vehicle, an automobile, a boat, an airplane, a drone, or a robotic device.

* * * * *